Figure 1:
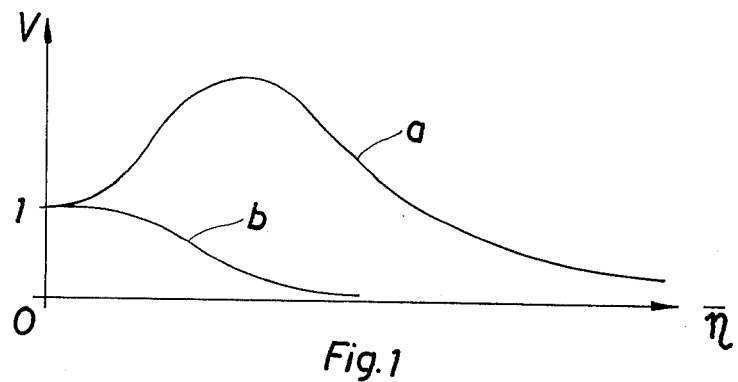

United States Patent [19]

Steinbach et al.

[11] 3,989,232

[45] Nov. 2, 1976

[54] AIR DAMPED SEATING FOR DEVICES AND VEHICLES

[75] Inventors: Manfred Steinbach; Karl-Heinz Wesslau, both of Jena, Germany

[73] Assignee: Jenoptik Jena G.m.b.H., Jena, Germany

[22] Filed: Apr. 11, 1975

[21] Appl. No.: 567,401

[52] U.S. Cl. .............................. 267/117; 267/122; 267/131; 248/400
[51] Int. Cl.² .......................................... F16F 5/00
[58] Field of Search ........... 267/120, 121, 122, 123, 267/117, 131; 248/400, 157, 397, 399; 188/298, 285; 180/77 R; 297/345, 216

[56] References Cited
UNITED STATES PATENTS

| | | | |
|---|---|---|---|
| 3,168,278 | 2/1965 | Ogden | 267/117 |
| 3,632,077 | 1/1972 | Hall et al. | 267/117 |
| 3,669,400 | 6/1972 | Lowe | 248/400 |
| 3,730,473 | 5/1973 | Pepi | 267/122 |

*Primary Examiner*—James B. Marbert

[57] ABSTRACT

An air damped seating particularly for devices and vehicles comprising a control chamber, an air chamber, both of variable volume, and a damping duct. The control chamber is provided with an air inlet flange and a valve, and is connected to the air chamber by a connection pipe. The damping duct is connected with one end portion to an air outlet opening of the air chamber and is tightly sealed on its other end portion. The length of the duct is defined by its radius, the excitation frequency of the oscillation to be damped, and by the mass to be damped, which is in connection with the chambers.

1 Claim, 2 Drawing Figures

AIR DAMPED SEATING FOR DEVICES AND VEHICLES

The invention is in concern of an air damped seating particularly for devices and vehicles, in which an air chamber of variable volume is connected to a control chamber and is provided with an air outlet opening.

Oscillations, particularly vertical oscillations in devices and vehicles, respectively, due to ground undulations or mechanical influences are damped or neutralized by elastical seatings such as steel springs, rubber shock absorbers or air cushions. The latter means are very advantageous compared to steel springs and rubber shock absorbers, owing to its low overall height and a comparatively short telescopic shock course, which is particularly effective at low frequencies.

Previous air damping means comprise an air chamber and a damping chamber being separated from each other by a separation wall, which has an opening of small diameter. The degree of the damping essentially depends on the dimension of said opening. Generally it was found that an effective neutralisation of the oscillation is not feasible with respect to all excitation frequencies at the same time.

Oscillations which have a frequency below 1.4 times of the fundamental frequency, are neutralised neither by air damping nor by mechanical damping.

It is an object of the present invention to avoid the aforementioned drawbacks.

It is a further object of the present invention to provide an air damped seating for devices and vehicles in which an oscillation neutralisation is ensured over a wide frequency range and particularly at the fundamental frequency of the oscillating system.

Accordingly, the present invention is concerned with an air damped seating for devices and vehicles, wherein an air outlet opening is provided with a damping duct, which in turn is closed at its free end, the length of said duct being at least $10^3$ times greater than its diameter and the air volume of said duct amounts to at least one tenth of the air volume of said air chamber.

The geometry and dimensions of the damping duct effect a flow which extends deep into the interior thereof at low excitation frequencies, which is not the case at high excitation frequencies.

Thus a damping is obtained reversely proportional to the excitation frequency, which ensures an oscillation neutralisation over the entire range of the excitation frequencies.

In order that the invention may be more readily understood, reference is made to the accompanying drawings, which illustrates diagrammatically and by way of example one embodiment thereof, and in which:

FIG. 1 shows a graph with respect to an oscillation neutralisation, and

Figure 2:
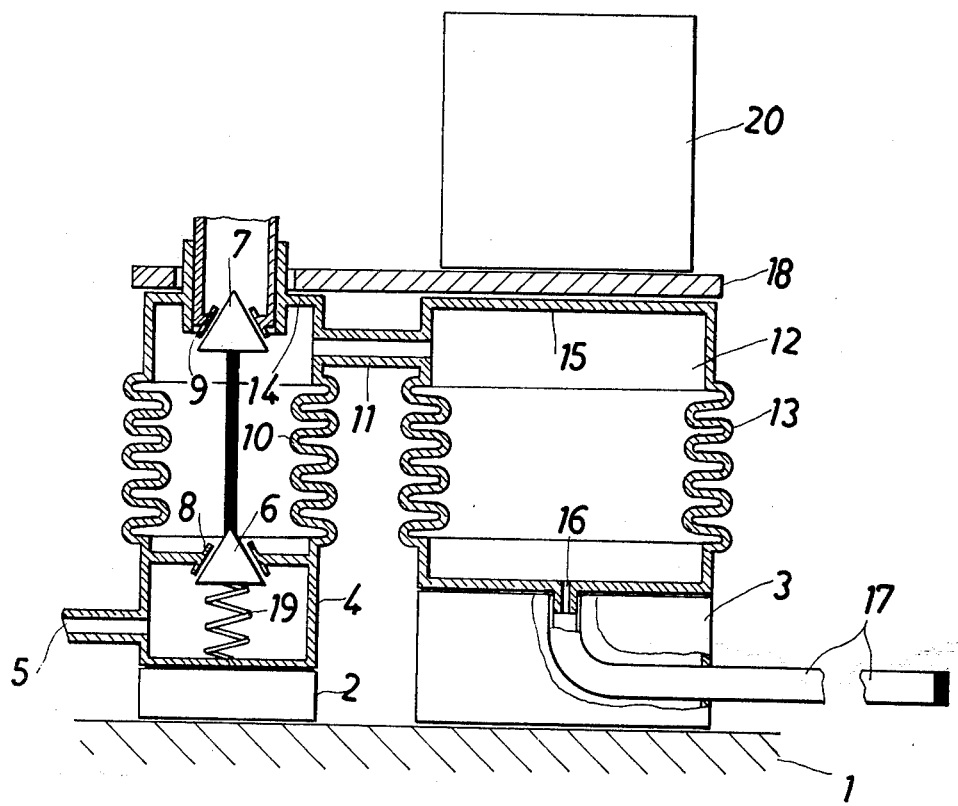

FIG. 2 a schematical view of an embodiment according to the invention of an air damped seating.

In FIG. 1, a graph is represented with the following designations: V is a multiplying function, $\bar{\eta}$ expresses a relation of frequencies to the respective coordinate axes of a Cartesian coordinate system having an origin 0.

V expresses the relation of the amplitude of a fundamental oscillation of a body to be neutralised to the amplitude of an excitation oscillation, due to, for example, ground movements.

$\bar{\eta} = \Omega/\omega$, in which $\Omega$ is the angular frequency with respect to the excitation source and $\omega$ the intrinsic angular frequency. The graph shows a curve $a$, which exemplifies the oscillation neutralisation effect of the previous air damped seatings, whereas a curve $b$ represents the oscillation neutralisation effect obtained by the inventional air damped seating. Both curves $a$ and $b$ have their origin at an amplitude relation 1. They are an expression of the oscillation neutralisation at a harmonic ground undulation as a function of the frequency relation $\bar{\eta}$.

In contrast to the previous air damped seatings, in which the multiplying function increases at first and then gradually decreases, said function decreases with respect to the inventional seating from the start to a comparatively low value.

In FIG. 2, two mounts 2, 3 are arranged on a base 1. The mount 2 is provided with a control chamber 4, which has an inlet flange 5, two valve cones 6, 7 rigidly connected with each other, a non-displaceable valve seat 8 and a displaceable valve seat 9, the walls of which are partially embodied by a bellow 10. A coil spring 19, which rests upon the bottom of the control chamber 4, presses the valve cones 6, 7 into respective seats 8, 9.

A connection pipe 11 connects the control chamber 4 to an air chamber 12, the walls of which are partially formed by a bellow 13, which rests upon the mount 3. The top plate 15 of said air chamber 12 is at the same height as a top plate 14 of the control chamber 4. A damping duct 17 is secured with one end portion to an air outlet flange 16 in the base of the air chamber 12, the other end portion of said duct 17 is sealed.

A plate mount 18, seated upon the control chamber 4 and the air chamber 12, carry a device 20, which is to be protected against oscillations.

Via the flange 5 the compressed air streams into the control chamber 4, and from whence through an outlet 21, the connecting pipe 11, and through an inlet opening 22 into the air chamber 12. The adjustment of the valve seat 9 permits an elevation adjustment of the device 20. The air is compressed through the air outlet opening 16 into the air duct 17. An oscillation propagating through the opening 16 and into the damping duct 17 is thus neutralised by volume variations, ensured by the bellow 13 of the air chamber 12. Due to the viscosity and compressibility of the compressed air, the air column contained in the air duct 17 shows a behaviour, which differs in dependence of the excitation frequency. When the intrinsic frequency $f$ [Hz] of the system, which neutralises an oscillation, is $$f = \frac{F_K}{2\pi} \cdot \sqrt{\frac{p_a}{V_a \cdot m}}, \qquad (1)$$

the degree of damping $$D = \frac{2\eta F_K^2}{\pi \cdot a^3} \cdot \sqrt{\frac{p_a}{2\pi \cdot f \cdot \eta}} \cdot \frac{1}{2\pi \cdot f \cdot m} \qquad (2)$$

and the length of the damping duct 17

$$l \approx 1.15 \cdot a \cdot \sqrt{\frac{p_a}{2\pi \cdot \eta \cdot f_{er}}} \qquad (3)$$

then, if the degree of damping becomes $D \approx 0.3$, an oscillation neutralisation over the entire excitation frequency range is obtained.

In the equations (1), (2) and (3), are $f$ = intrinsic frequency [Hz]
$f_{ex}$ = excitation frequency [Hz]
$F_K$ = cross-sectional area of the air chamber [cm$^2$]
$p_o$ = supporting capacity [kpcm$^{-2}$]
$V_o$ = volume of the air chamber [cm$^3$]
$m$ = mass of a device [kg]
$D$ = degree of damping
$\eta$ = air viscosity [kg s cm$^{-2}$]
$a$ = radius of the damping duct [cm]
$l$ = length of damping duct [cm]
$\pi$ = 3,14159.

In accordance with equation 2, the required radius of the damping duct is defined when $f$, $m$, $p_o$, $F_K$ are given.

The parameters of an applicable embodiment of an air chamber of, for example, 10 . 10 . 10 cm$^3$, a support capacity of 2.5 kpcm$^{-2}$ and a mass of about $m$=60kg, will yield a diameter of the damping duct of $2a \approx 4$ mm.

The length of the duct is calculated from equation (3) with $f_{ex} \geq f$, and will result in $l \approx 120$m.

Such dimensions permit intrinsic frequencies of $f \leq 2$Hz. The invention will not be restricted to the aforementioned embodiment.

Thus the variation of the air volume in the air chamber 12 and in the prearranged control chamber may be obtained other than by bellows 10, 13, but, for example, by cylinders which are inserted telescope like one into the other, or in any other suitable manner.

Furthermore, it is irrelevant to the invention, which material the damping duct is made of, only the tightness has to be ensured, and whether the duct is straight or of helical geometry.

The contact means of the device or vehicles to be cushioned is not restricted to the plate mount described in connection with the drawing.

We claim:
1. An air damped seating particularly for devices and vehicles comprising
   a control chamber including an air inlet flange, a valve
   and an air outlet opening
      the volume of said chamber being variable,
   an air chamber having an air inlet opening and an air outlet flange,
      the volume of said air chamber being variable,
   a connection pipe being arranged between said air outlet opening and said air inlet opening,
   and a damping duct being connected with one end portion to said air outlet flange, the other end portion being sealed,
      the length of said damping duct being at least 10$^3$ times the diameter thereof,
      the volume of said damping duct being at least one tenth of the volume of said air chamber.

* * * * *